(12) United States Patent
Giannopoulos et al.

(10) Patent No.: US 8,933,681 B2
(45) Date of Patent: Jan. 13, 2015

(54) INTEGRATED POWER SUPPLY WITH WIDE INPUT SUPPLY VOLTAGE RANGE

(75) Inventors: Demetri J. Giannopoulos, Austin, TX (US); Aaron Shreeve, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 399 days.

(21) Appl. No.: 13/534,838

(22) Filed: Jun. 27, 2012

(65) Prior Publication Data
US 2013/0285628 A1   Oct. 31, 2013

Related U.S. Application Data

(60) Provisional application No. 61/640,443, filed on Apr. 30, 2012.

(51) Int. Cl.
*G05F 5/08* (2006.01)

(52) U.S. Cl.
USPC ............ 323/303; 323/266; 323/267; 323/901

(58) Field of Classification Search
USPC ......... 323/266, 267, 269, 271, 299, 303, 350, 323/901; 363/62
See application file for complete search history.

(56) References Cited

U.S. PATENT DOCUMENTS

| | | | |
|---|---|---|---|
| 5,815,383 A | 9/1998 | Lei | |
| 6,762,595 B2* | 7/2004 | Tamai et al. | 323/266 |
| 6,771,052 B2* | 8/2004 | Ostojic | 323/266 |
| 7,327,130 B1* | 2/2008 | Giannopoulos | 323/285 |
| 7,456,617 B2* | 11/2008 | Chapuis et al. | 323/267 |
| 8,289,010 B1* | 10/2012 | Fernald et al. | 323/283 |
| 8,354,828 B2* | 1/2013 | Huang et al. | 323/267 |
| 8,773,103 B2* | 7/2014 | Yonezawa et al. | 323/299 |
| 2013/0285628 A1* | 10/2013 | Giannopoulos et al. | 323/273 |
| 2013/0300385 A1* | 11/2013 | Li et al. | 323/271 |

OTHER PUBLICATIONS

"High Efficiency Inductorless Step-Down DC/DC Converters;" Linear Technology, LTC1503-1.8/LTC1503-2, 1999, retrieved from <http://cds.linear.com/docs/en/datasheet/1503f.pdf> on May 28, 2013; pp. 1-12.

"Properties of the Charge-Pump Voltage Splitter;" Maxim Integrated Products, Tutorial 718, Mar. 4, 2009, retrieved from <http://www.maximintegrated.com/an718>; pp. 1-6.

* cited by examiner

*Primary Examiner* — Jeffrey Sterrett

(74) *Attorney, Agent, or Firm* — Meyertons Hood Kivlin Kowert & Goetzel, P.C.; Jeffrey C. Hood

(57) ABSTRACT

A novel integrated switched mode power supply circuit that provides supply voltages to an integrated circuit may be of minimal complexity and have the capacity for a wide range of input supply voltages. The novel power supply may include cascaded, unregulated step-down charge pumps (e.g. unregulated voltage splitters), one or more linear regulators coupled to the output of the cascaded voltage splitters, and a start-up current source to provide the IC supply current until the input supply voltage is sufficiently high for the voltage splitter(s) to be functional to provide the IC supply current. Furthermore, each voltage splitter may be activated or disabled depending on the value of the input supply voltage, and the input of a disabled voltage splitter may be shorted to its output via an integrated power switch. Using (cascaded) voltage splitters to provide the IC supply current reduces overall power dissipation in the IC.

37 Claims, 4 Drawing Sheets

INTEGRATED POWER SUPPLY WITH WIDE INPUT SUPPLY VOLTAGE RANGE

PRIORITY CLAIM

This application claims benefit of priority of U.S. provisional application Ser. No. 61/640,443 titled "Integrated Power Supply with Wide Input Supply Voltage Range", filed Apr. 30, 2012, which is hereby incorporated by reference in its entirety as though fully and completely set forth herein.

Figure 1:
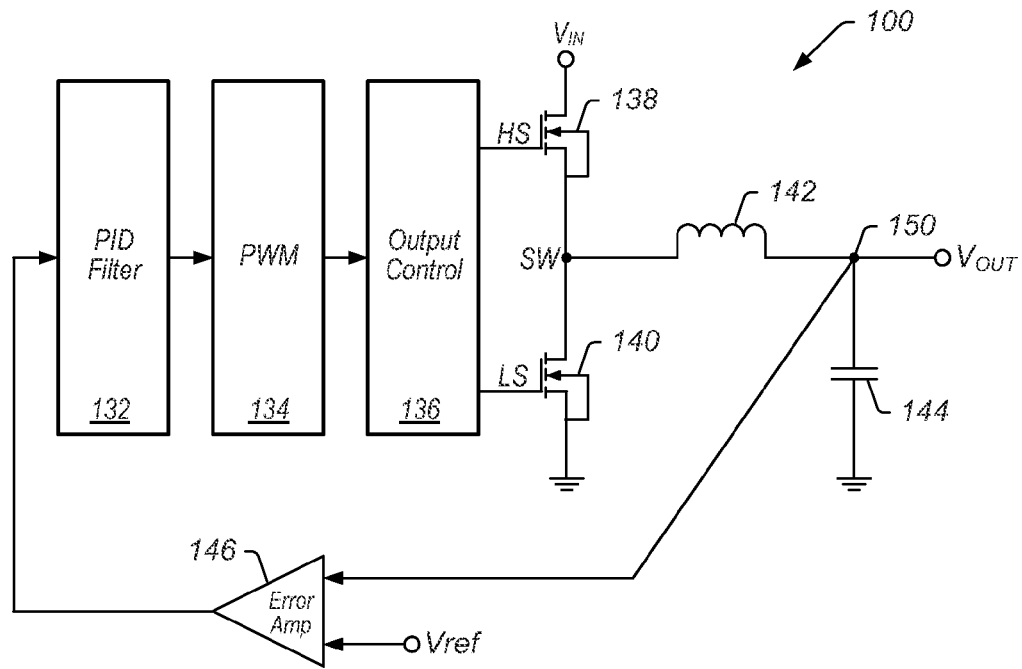
FIG. 1 shows a simplified circuit diagram of a prior art buck converter power regulator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

Integrated circuits (ICs) typically require tightly regulated supply voltage(s) to power different circuit blocks within the ICs. In some cases the IC circuitry may use more than one supply voltage to power various designated circuit blocks within the IC, to reduce power losses, and to achieve optimum performance. For instance, a number of digital and/or analog circuits (which may include various companion and/or support circuits) within an IC may require a different supply voltage than the supply voltage provided to the core digital circuits/components of the IC. The supply voltage required by the IC can be provided by an external voltage supply, or it can be generated on-chip. The power supply used for generating the IC supply voltage can be a linear regulator or a high efficiency switched-mode power supply. In cases where an input voltage ($V_{in}$) with a considerably higher value than the required IC supply voltage ($V_{DD}$) is available, and the power losses resulting from the use of a linear regulator are unacceptable, a high-efficiency switched-mode power supply is typically used to generate $V_{DD}$ from $V_{in}$. Using another general-purpose switched-mode power converter as an auxiliary power supply to provide an additional, different IC supply voltage is not practical in many applications due to the additional cost and increased printed circuit board area.

The switched-mode power supplies, or step-down regulators that perform the DC-to-DC voltage conversion are also referred to as voltage regulators or point-of-load (POL) regulators/converters, converting the higher voltage $V_{in}$ (e.g. 12V) to a lower value as required by one or more load devices. Switching power regulators often use two or more power transistors to convert energy from one voltage to another voltage. One common example of such a power regulator 100, commonly called a "Buck Regulator" is shown in FIG. 1. Buck Regulator 100 typically switches a pair of power transistors (138 and 140) in order to produce a square-wave at the transistors' common node SW. The produced square-wave can be smoothed out using an LC circuit comprising inductor 142 and capacitor 144 to produce the desired voltage, $V_{out}$ at node 150. A control loop, comprised of an Error Amplifier 146, a Proportional-Integral-Differential (PID) Filter 132, a Pulse-Width-Modulator (PWM) 134, and an Output Control circuit 136, can be configured to control the duty-cycle of the output square-wave, and hence the resulting value of $V_{out}$. In general, the control loop may include other similar or somewhat different control elements than those shown in FIG. 1 to control the switching of high-side and low-side power transistors 138 and 140.

Figure 8:
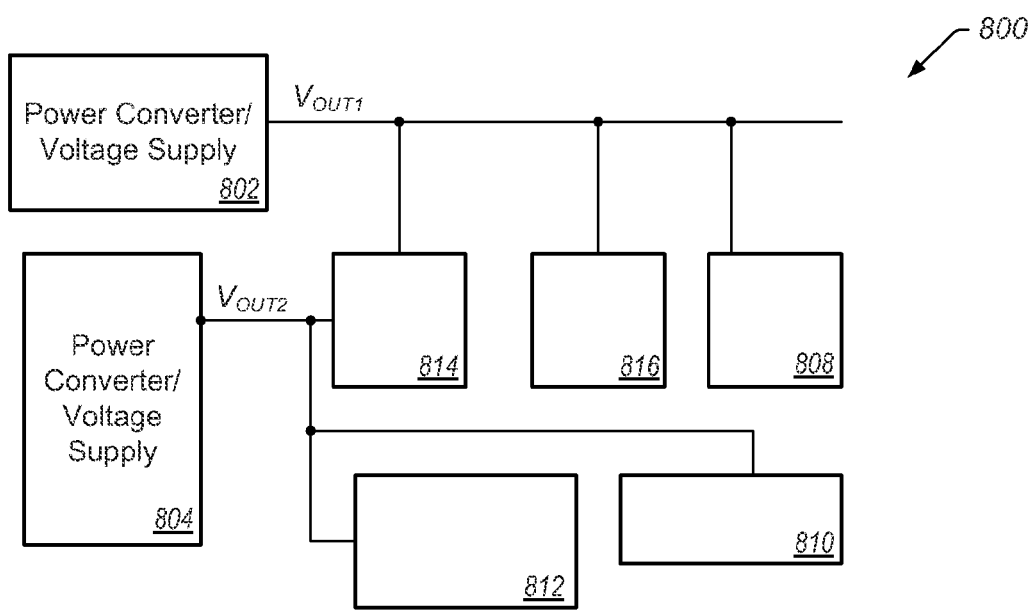
FIG. 8 shows a block diagram of one embodiment of a system that includes power converters (voltage supplies).

FIG. 8 shows one embodiment of a system that includes power converters (or voltage supplies). In system 800, power converters 802 and 804 are used to provide supply voltage for various system components 806-814. System components 806-814 may include various digital and/or analog functional blocks. Examples of such blocks include processing elements (e.g. microcontrollers, microprocessors, application specific processing circuits, etc.), memory elements, digital-to-analog converters, amplifiers, and/or any other similar components. Each system component may itself include subcomponents and/or additional power converters if necessary, and so on and so forth. In some cases, the various system components may not all require the same supply voltage. For example, components 816 and 812 may require different supply voltages. Furthermore, components 816 and 812 may be configured on the same integrated circuit, yet require different supply voltages. Accordingly, multiple power converters may provide supply voltages to multiple respective system components/blocks. In addition, some system components may receive supply voltage from more than one power converter when various subcomponents within the system component require different supply voltages. For example, in the embodiment shown, system component 714 receives supply voltage $V_{OUT1}$ from power converter 702, and also receives supply voltage $V_{OUT2}$ from power converter 704, and power converters 802 and 804 are both shown to supply voltages to different system components. Furthermore, the power converters may themselves include circuit elements and/or components requiring supply voltages provided by power supplies included within the power converter. Therefore, one or more of the power converters in system 700 may include one or more elements such as those shown in FIGS. 2-7, which will be discussed in detail further below.

Figure 2:
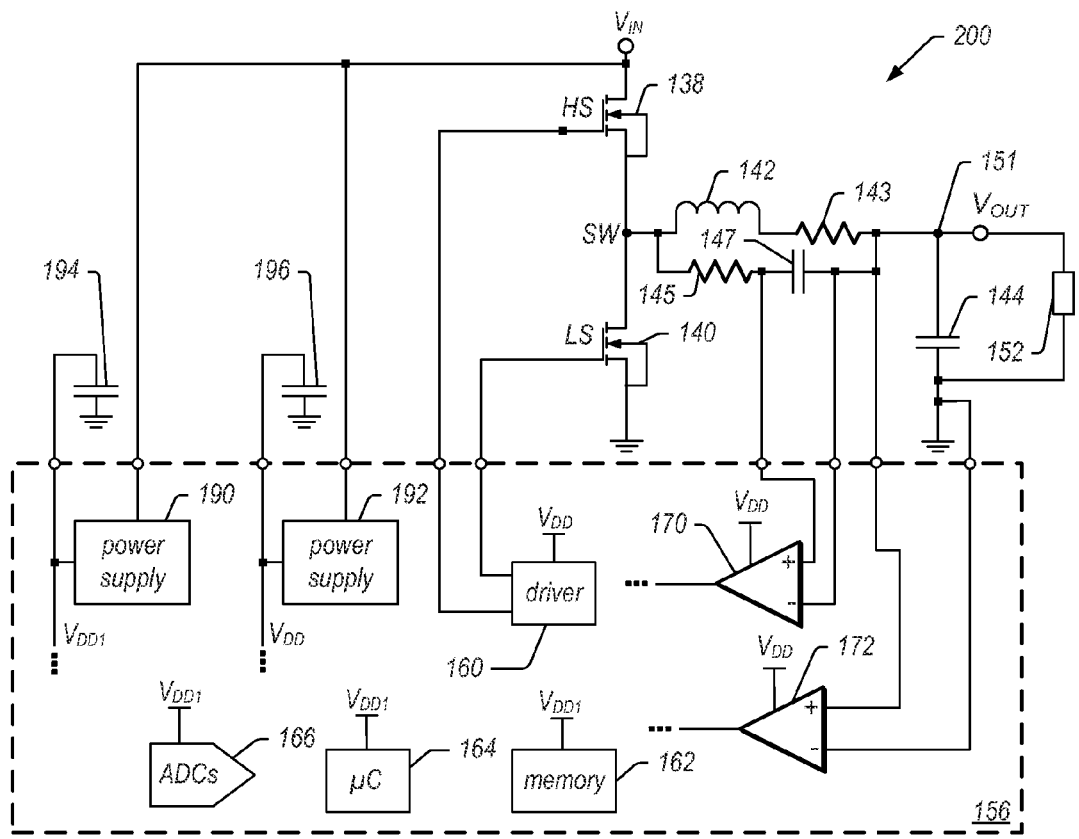
FIG. 2 shows a simplified circuit diagram of one embodiment of a power converter with an integrated control circuit that uses auxiliary power supplies to generate different supply voltages inside the integrated control circuit.

As mentioned above, power supplies (or power converters/regulators) such as regulator 100, and power converters/voltage supplies 802 and 804 may accept an input voltage $V_{IN}$ and generate a different value output voltage $V_{OUT}$ that can provide a high current of several amperes (Amps, or A) to a load with high efficiency. In DC-DC power converters the input voltage is sometimes as low as a few volts (V) while in other instances it might exceed 100V. FIG. 2 shows the topology of one embodiment of a DC-DC power converter that uses a controller IC 156 to generate the gate signals of the two power switches 138 and 140 to regulate the output voltage $V_{OUT}$ at node 151 to a specified regulated voltage value. Digital controller 156 may include driver circuitry 160 to provide appropriate drive signals to switching devices 138 and 140, one or more ADCs 166 (Analog to Digital Converters) to generate digital versions of sensed analog signal values, and a processing unit 164 to provide overall control over the operation of controller 156. Digital controller 156 may also include an integrated voltage-sense amplifier 172 and an integrated current-sense amplifier 170. Resistor 145 and capacitor 147 are used to provide the appropriate signals to integrated voltage-sense amplifier 172 and integrated current-sense amplifier 170 as required for sensing the appropriate voltage and current values. Resistor 143 represents the DC resistance of inductor 142.

The controller IC 156 may also provide protection from faults such as short circuit of the output, and may be designed to monitor the output current and output voltage using current sense amplifier 170 and voltage sense amplifier 172, respectively. $V_{OUT}$ developed/generated at node 151 is provided to a load 152. The control circuitry in the IC 156 might require a regulated supply voltage $V_{DD}$ having a considerably lower value than the value of the available input voltage $V_{IN}$. The supply voltage $V_{DD}$ of the control IC 156 may be generated from the input voltage $V_{IN}$ of the power converter. This is illustrated by power supplies 190 and 192 respectively generating two different internal supply voltages $V_{DD1}$ and $V_{DD}$ for IC 156. For example, $V_{DD1}$ may have a nominal value of 2.5V while $V_{DD}$ may have a nominal value of 5V. Accordingly, IC 156 may use $V_{DD}$ internally as the supply voltage provided to sense amplifiers 170 and 172, and to the driver circuit 160, while $V_{DD1}$ may be the supply voltage provided to various other components such as ADCs 166, microcontroller (or microprocessor) 164, and memory 162. Preferably, the power losses in power supplies 190 and 192 are not significant, as power losses would reduce the total efficiency of the power converter 200.

Figure 3:
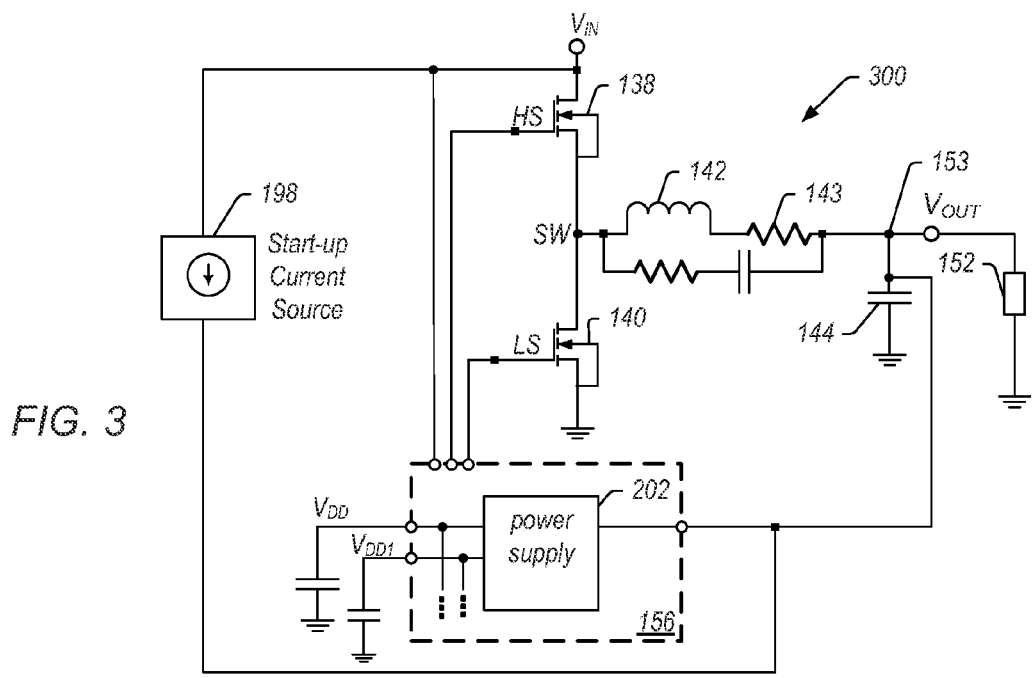
FIG. 3 shows a simplified circuit diagram of one embodiment of a power converter in which the controller IC supply voltages are generated by an integrated power supply with wide input supply voltage range.

In some cases, power supply 190 and/or power supply 192 may not be able to provide the necessary supply voltage upon start-up, in which case a start-up current source may be used to initially power up the controller IC 156 until power supply 190 and/or power supply 192 is ready to provide $V_{DD1}$ and $V_{DD2}$, respectively. As seen in the example provided in FIG. 3, a start-up current source 198 may be installed to power the controller IC 156 during power-up until power supply 202 is capable of providing $V_{DD}$ and $V_{DD1}$. As shown in FIG. 3, power supply 202 is providing both supply voltages, $V_{DD}$ and $V_{DD1}$. In one set of embodiments, power supply 202 is a novel integrated switched mode power supply (ISPS) of minimum complexity that may be designed to provide the respective supply voltages to the circuitry of a controller IC, or to various system components, with a wide range of input supply voltages. The novel ISPS may not require any external components other than a specified number of capacitors, and may operate with reduced power consumption by providing an IC supply current having a value that is 50% lower than a corresponding current obtained when using a linear regulator. The ISPS may be easily integrated as an auxiliary function in a controller IC due to its simplicity of implementation. In addition, the self-contained integrated IC supply does not place any requirement of a specific power-up sequence on the available power supplies in the application, or any requirement on the values of these power supplies. In some embodiments, the start-up current source 198 may be included as part of power supply 202.

Inductor-based power/voltage conversion provides the highest efficiency but involves high complexity and cost. Regulated step-down charge pumps have lower cost and complexity than inductor-based power converters while providing a significant power efficiency improvement over linear regulators. In one set of embodiments, a switched mode power supply (SPS) may include one or more cascaded, unregulated step-down charge pumps (unregulated voltage splitters—UVS), one or more linear regulators coupled to the output of the cascaded voltage splitters, and a start-up current source to provide the IC supply current until $V_{IN}$ is sufficiently high for the voltage splitter to be functional to provide the IC supply current.

Furthermore, each UVS may be activated (enabled) or deactivated (disabled) depending on the value of the input voltage $V_{IN}$, and the input of a disabled voltage splitter may be shorted to its output via an integrated power switch. One major advantage of a UVS is that it may be operated through a simple control mechanism. In one set of embodiments, one such control mechanism may include an oscillator that generates two non-overlapping phases fed to level shifters/gate drivers driving four power switches, which may be sufficient to operate an unregulated voltage splitter.

In one set of embodiments, a semiconductor device, which may be an integrated circuit (IC) may include a voltage supply circuit that may couple to external capacitors to operate as an efficient voltage supply circuit capable of providing multiple supply voltages within the IC. Therefore, the IC may include one or more linear voltage regulators each having a respective input node for receiving a respective portion of a supply current, and each configured to provide a respective output supply voltage based on the received respective portion of the supply current. Each linear regulator may operate to provide a different voltage supply, i.e. a voltage supply of different value. For example, one linear regulator may provide 2.5V, while another may provide 5V, and so on and so forth. The IC may also include at least two unregulated voltage splitters (or step-down charge pumps) coupled in a cascade configuration. In other words, the voltage splitters may be coupled in series to form a series of cascaded voltage splitters, where a respective output node of each voltage splitter is coupled to a respective input node of a next voltage splitter in the series. At the front end of the cascaded voltage splitters, the respective input node of the first voltage splitter in the series may receive an input voltage, while at the back end of the cascaded voltage splitters, the respective output node of the last voltage splitter in the series may be coupled to the respective input node of each linear voltage regulator, to provide the supply current based on the input voltage under a first set of conditions.

The IC may additionally include a start up current source coupled to the respective input node of each linear voltage regulator, to provide the supply current under a second set of conditions. In one embodiment, the first set of conditions occurs when the voltage splitters are disabled, while the second set of conditions occurs when the input voltage is sufficiently high for at least one of the cascaded voltage splitters to become functional for the respective output node of the last voltage splitter to provide the supply current. In some embodiments, the last voltage splitter in the series may be operated to turn on when the input voltage reaches a first threshold value, and responsive to turning on, effect at least a first portion of the supply current at its respective output node. The first voltage splitter may be operated to turn on when the input voltage reaches a second threshold value higher than the first threshold value, and responsive to turning on, effect at least a second portion of the supply current at the respective output node of the last voltage splitter.

Each voltage splitter may include a first, second, and third control node configured to respectively couple to a first, second, and third capacitor. Each voltage splitter may also include switching circuitry that can be operated to switchably couple the first capacitor in parallel with the second capacitor across the respective input node and the respective output node of the voltage splitter during a first switching phase, and switchably couple the first capacitor in parallel with the third capacitor across the respective output node of the voltage splitter and a voltage reference during a second switching phase. In one embodiment, the switching circuitry is constructed of transistor devices configured as switching elements, with gate drivers controlling the switching of the transistor devices. Accordingly, during the first switching phase, the switching circuitry controls a first number of the gate drivers to enable an associated first number of the transistor devices, and controls a remaining number of the gate drivers to disable an associated remaining number of the transistor devices. Similarly, during the second switching phase, the switching circuitry controls the first number of the gate drivers to disable the associated first number of the transistor devices, and controls the remaining number of the gate drivers to enable the associated remaining number of the transistor devices.

The switching circuitry may further incorporate a signal generator for generating two complementary clock signals to control the gate drivers, with the two complementary clock signals being respectively associated with the first switching phase and the second switching phase. The approximate effective output resistance value of each voltage splitter may be given by the equation $R_O=1/(f_{osc}*C_F)$, wherein $f_{osc}$ is an operating frequency of the switching circuitry corresponding to the rate at which the first capacitor is switchably coupled in parallel with the second capacitor, and the first capacitor is switchably coupled in parallel with the third capacitor, and $C_F$ is the capacitance value of the first capacitor (assuming that the on-resistance of the switching transistors and the ESR of the capacitors are practically negligible compared to $R_O$). Finally, the switching circuitry may also be operated to short the respective input node of the voltage splitter to the respective output node of the voltage splitter, responsive to receiving an enable input value instructing the switching circuitry to disable the voltage splitter.

Figure 4:
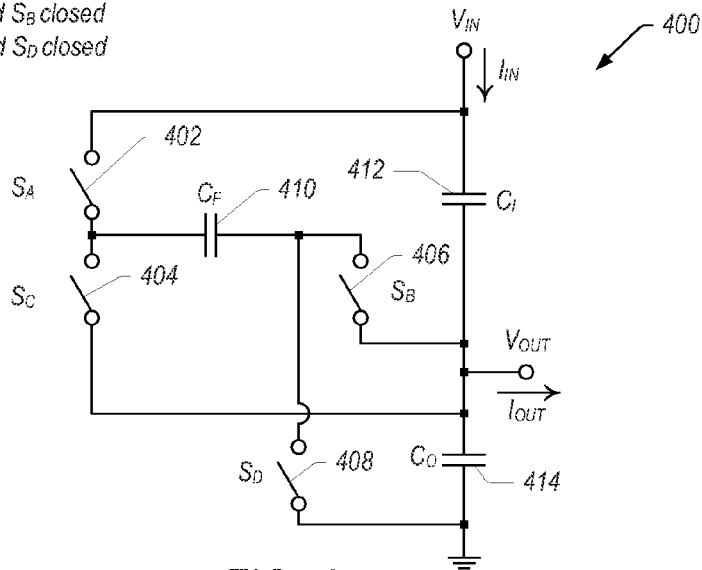
FIG. 4 shows a simplified schematic diagram of one embodiment of a step-down charge-pump (i.e., an unregulated voltage splitter)

A simplified schematic of one embodiment of a UVS 400, including the switches (which may be power devices in certain embodiments) of the circuit, is shown in FIG. 4. The UVS 400 may include three discrete components, capacitors $C_F$ 410, $C_I$ 412, and $C_O$ 414. The flying capacitor $C_F$ 410 may be switchably coupled in parallel with capacitor $C_I$ 412 during phase 1 of a switching sequence, while in phase 2 of the switching sequence, $C_F$ 410 may be switchably coupled in parallel with capacitor $C_O$ 414. As a result, the respective voltages across capacitors $C_I$ 412 and $C_O$ 414 may be of approximately equal value. The input-output relationship is given by:

$$V_{OUT}=(V_{IN}/2)-R_O*I_{OUT}, \quad (1)$$

where (ignoring switch resistances and capacitor equivalent series resistances—ESRs):

$$R_O=1/(f_{osc}*C_F). \quad (2)$$

In equation (2) above, $f_{osc}$ is the switching frequency. For $I_{OUT}=0$, the voltages of the two capacitors $C_I$ 412 and $C_O$ 414 are equal.

Furthermore, the input current and output current are related by the relationship, $I_{IN} \cong I_{OUT}/2$. By reducing the input current $I_{IN}$ of the UVS 400 to approximately half of the output current $I_{OUT}$, the power dissipation is decreased by effectively cutting the supply current of an integrated circuit to approximately half the value of a corresponding supply current generated using a linear regulator. The efficiency of an unregulated voltage splitter can be greater than 90%, depending on the values of the on-resistance of switches $S_A$ 402, $S_B$ 406, $S_C$ 404, $S_D$ 408 and the capacitor ESR resistance of $C_F$ 410, $C_I$ 412 and $C_O$ 414 (lower resistance values increase efficiency).

Figure 5:
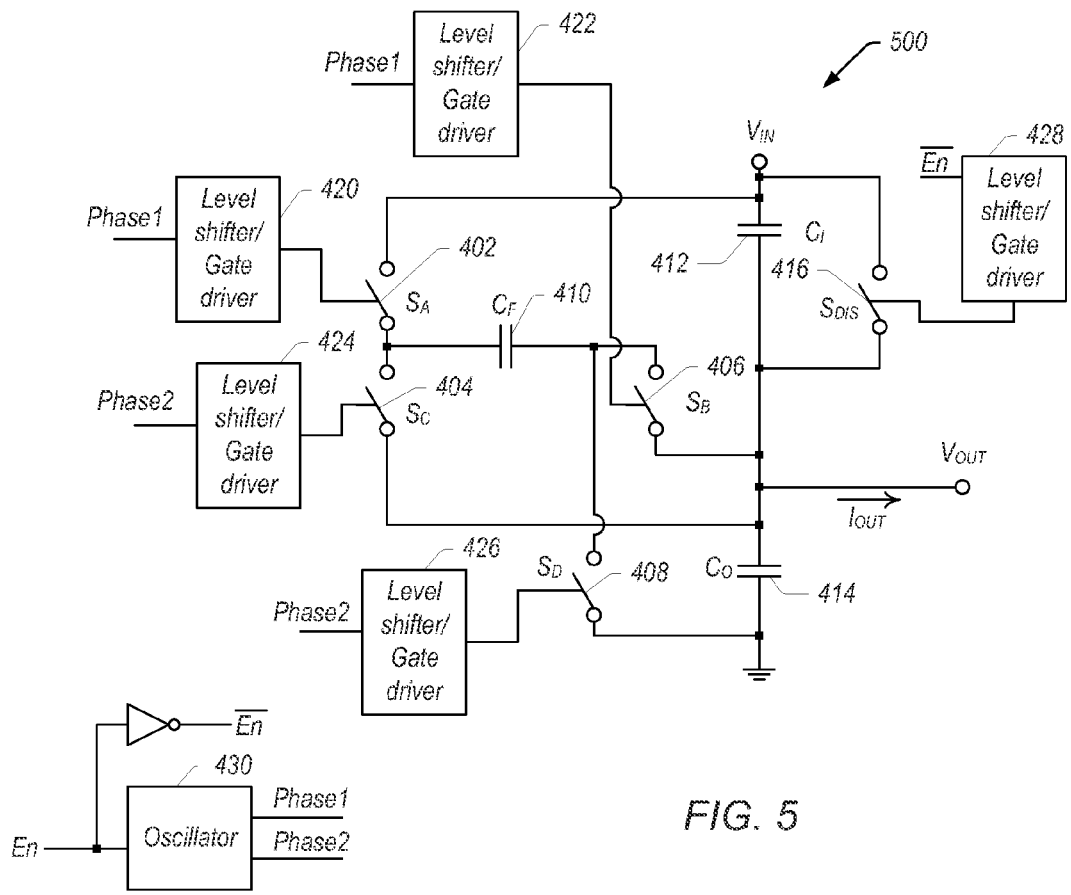
FIG. 5 shows a simplified schematic diagram of one embodiment of an unregulated voltage splitter, including functional circuit blocks.

FIG. 5 shows a partial block diagram that includes various circuit blocks used in one embodiment of a UVS 500. An oscillator 430, when enabled, may generate two complementary clock phases, Phase 1 and Phase 2, respectively. That is, when Phase 1 is active, Phase 2 is inactive, and vice-versa. The two complementary clock phase signals may be provided to level shifters/gate drivers 420, 422, 424, 426, and 428 to control the state of the switches $S_A$ 402, $S_B$ 406, $S_C$ 404, $S_D$ 408, and $S_{DIS}$ 416, respectively. Thus, in one set of embodiments, switches $S_A$ 402, $S_B$ 406, $S_C$ 404, $S_D$ 408, and $S_{DIS}$ 416 may be implemented as transistor devices, e.g. CMOS devices respectively controlled through gate drivers 420, 422, 424, 426, and 428. When the oscillator 430 is disabled, the input $V_{IN}$ of the UVS 500 may be shorted to its output $V_{OUT}$ via the switch $S_{DIS}$ 416, to effectively disable UVS 500. Therefore, an enable signal EN (shown having a negative assertion level in FIG. 5) may be used to enable/disable UVS 500. A UVS alone may reduce the power dissipation approximately in half, but it may not be able to provide the regulated supply voltages required by the analog and digital circuit blocks within the IC (e.g. within IC 156).

Figure 6:
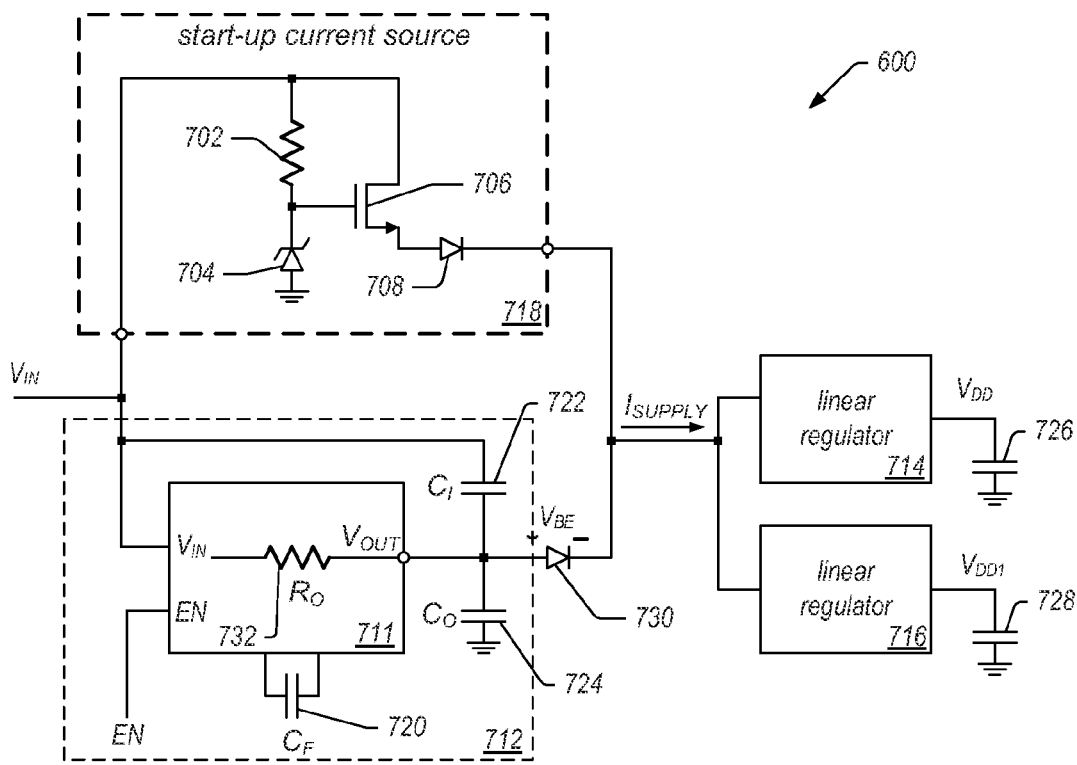
FIG. 6 shows a simplified schematic diagram of one embodiment of an integrated voltage supply that includes a voltage splitter and two linear regulators.

FIG. 6 shows one embodiment of a voltage supply circuit 600 that includes a combination of a UVS 712 and (one or more) linear regulators 714/716. The combination shown in FIG. 6 may reduce the IC power consumption by approximately 50% or more, and generates the regulated supply voltages required by the circuit blocks of the IC (e.g. of IC 156). Voltage supply circuit 600 may include a start-up current source 718, which may provide the IC supply current during power up until $V_{IN}$ is sufficiently high (e.g. a value of a few Volts in some embodiments) for the voltage splitter 712 to become functional and provide the IC supply current. An exemplary implementation of current source 718 with a transistor device 706, resistance 702, and diodes 704 and 708 is provided in FIG. 6. It is contemplated that diode 704 may be replaced by an adjustable reference circuit (e.g. a bandgap-reference based circuit), and that diode 708 may be eliminated from circuit 718.

UVS 712 shown in FIG. 6 includes a switching core 711, which may include the switching elements, e.g. transistor devices, and the gate drive circuitry to drive/control the transistor/switching devices, as exemplified in FIG. 5, for example. In some embodiments, voltage supply 600 may be an integrated switching power supply that includes start-up current source 718, switching core 711, diode 730 and linear regulators 714 and 716. For example, the aforementioned components of voltage supply circuit 600 may be integrated as part of a control IC similar to IC 156 shown in FIG. 156. Capacitors 720, 722, 724, 726, and 728 may be selected as components external to the integrated circuit components. $R_O$ 732 is shown for illustrative purposes and represents the value of the effective output resistance of the voltage splitter 712, as defined in equation (2). UVS 712 also includes input capacitor 722, output capacitor 724, and flying capacitor 720. In some embodiments, UVS 712 may include circuitry to generate the clock signal(s) controlling the gate drive circuitry within switching core 711. For example, it may include an oscillator such as oscillator 430, which may receive enable signal EN similar to oscillator 430, and provide an inverse of the enable signal EN to the gate drive circuit controlling the switch that shorts together the input and output of UVS 712 to effectively disable/enable UVS 712.

The UVS enable signal EN may be asserted responsive to the value of the input voltage $V_{IN}$. That is, once the input voltage $V_{IN}$ crosses a specified threshold voltage, the enable signal EN may be asserted to enable UVS 712. The $V_{IN}$ crossing threshold, that is, the minimum value of $V_{IN}$ at which the voltage splitter 712 is activated, may be programmable, and may be specified such that it is high enough for the linear regulator(s) 714/716 to output a regulated output voltage $V_{DD}/V_{DD1}$. Specifically, in one set of embodiments, the EN signal may be asserted when:

$$V_{IN}/2 - I_{supply} * R_O - V_{BE} > V_{DD} + V_{DO}, \quad (3)$$

where $I_{supply}$ is the IC supply current, $R_O$ is the value of the effective output resistance of the voltage splitter 712 as defined in equation (2)—which, as previously mentioned, is shown in FIG. 6 as resistor 732 for illustrative purposes—and $V_{DO}$ is the (respective) dropout voltage of (each of) the linear regulator(s) 714/716. Therefore the minimum input voltage $V_{INmin}$ at which the EN signal is asserted may be given by:

$$V_{INmin} = 2*(V_{DD} + V_{DO} + I_{supply} * R_O + V_{BE}). \quad (4)$$

For an IC to benefit from the power supply topology shown in FIG. 6, the upper limit of its input supply voltage range is expected to exceed $V_{INmin}$.

Figure 7:
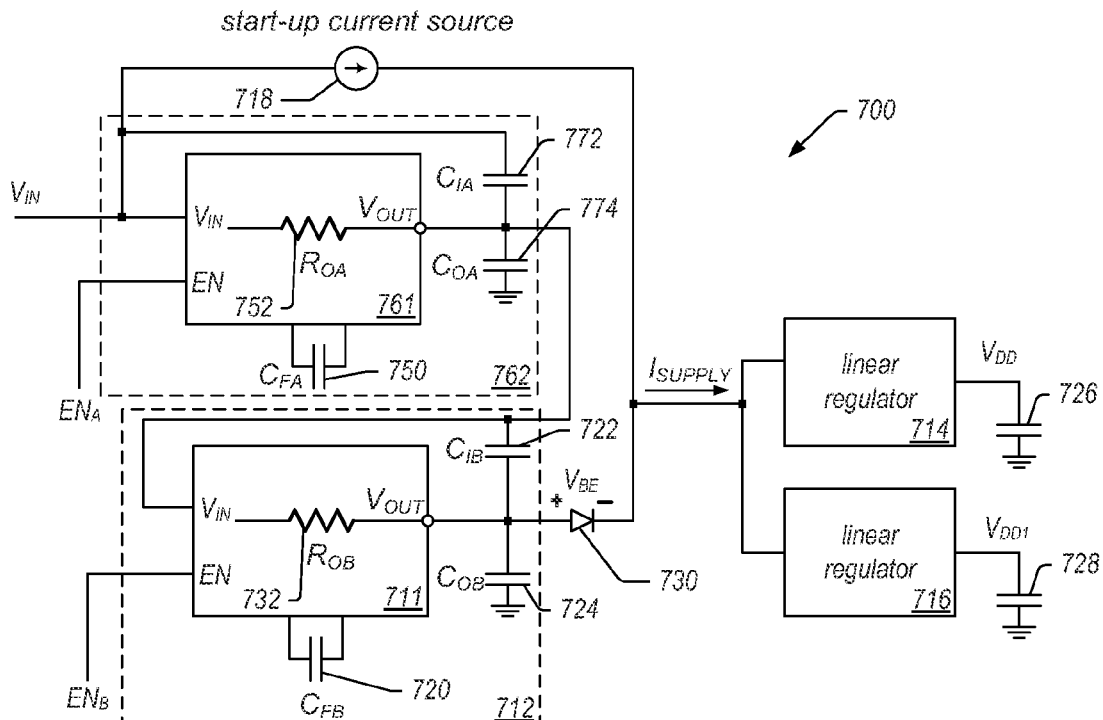
FIG. 7 shows a simplified schematic diagram of one embodiment of an integrated voltage supply that includes two cascaded voltage splitters and two linear regulators.

An integrated circuit with a wide input voltage range can benefit from the power supply topology shown in FIG. 7. As shown in FIG. 7, a voltage supply circuit 700 may include two cascaded voltage splitters 762 and 712 followed by one or more linear regulators 714 and 716 that may output the regulated supply voltages $V_{DD}$ and $V_{DD1}$ to the appropriate circuit blocks within the IC (e.g. within IC 156). While FIG. 7 shows 2 voltage splitters and two linear regulators, it should be noted that alternate embodiments may include more than two cascaded voltage splitters (or step-down charge pumps), and more than two linear regulators (though some may include a single linear regulator.) Compared to voltage supply circuit 600, a second UVS 762 has been added to the circuit, coupled as shown in FIG. 7. In the embodiment shown in FIG. 7, the input voltage is coupled to the input node of UVS 762, and an enable signal $EN_A$ is used to enable/disable UVS 762, while an enable signal $EN_B$ is used to enable/disable UVS 712. The output of UVS 762 is coupled to the input of UVS 712, resulting in the cascaded configuration of the two UVS's. UVS 762 is shown including a switching core 761, which, similar to UVS 712, may include the switching elements, e.g. transistor devices, and the gate drive circuitry to drive/control the transistor/switching devices, as exemplified in FIG. 5. It is contemplated that UVS 761 and 711 may share some circuit blocks, e.g. oscillator 430.

Similar to voltage supply circuit 600, in some embodiments, voltage supply 700 may be an integrated switching power supply that includes start-up current source 718, switching cores 711 and 761, diode 730, and linear regulators 714 and 716. For example, the aforementioned components of voltage supply circuit 700 may be integrated as part of a control IC similar to IC 156 shown in FIG. 156. Capacitors 720, 722, 724, 750, 772, 774, 726, and 728 may be selected as components external to the integrated circuit components. $R_{OA}$ 752 is shown for illustrative purposes and represents the value of the effective output resistance of the voltage splitter 762. UVS 762 may also include input capacitor 772, output capacitor 774, and flying capacitor 750. UVS 762 may also include circuitry to generate the clock signal(s) controlling the gate drive circuitry within switching core 761. Thus, an oscillator such as oscillator 430 shown in FIG. 5, may receive enable signal $EN_A$, and provide an inverse of the enable signal $EN_A$ to the gate drive circuit controlling the switch that shorts together the input and output of UVS 762 to effectively disable/enable UVS 762.

For low $V_{IN}$ values, both voltage splitters 762 and 712 may be disabled. For higher $V_{IN}$ values, e.g. $V_{IN}$ values that exceed a first (specified) threshold voltage, UVS 712 may be activated via enable signal $EN_B$, while UVS 762 may disabled via enable signal $EN_A$, thereby reducing the IC power dissipation by a factor of approximately two, compared to the power dissipation when the IC supply current $I_{SUPPLY}$ is provided via a linear regulator. When $V_{IN}$ exceeds a second (specified) threshold value (higher than the first threshold value), both UVS 712 and UVS 762 may be activated via enable signals $EN_B$ and $EN_A$, respectively, thereby reducing the IC power dissipation by a factor of approximately four, compared to the power dissipation when the IC supply current is provided via a linear regulator.

For example, UVS 712 may be enabled for $V_{IN}$ values exceeding $V_{INmin,B}$, where $$V_{INmin,B} = 2*(V_{DD} + V_{DO} + I_{supply} * R_{OB} + V_{BE}), \quad (5)$$

and UVS 762 may be activated for $V_{IN}$ values that satisfy the relationship:

$$V_{IN}/4 - I_{supply} * R_{OB} - I_{supply} * R_{OA}/2 - V_{BE} > V_{DD} + V_{DO}. \quad (6)$$

Equivalently, UVS 762 may be activated when $V_{IN}$ exceeds the threshold $V_{INmin,A}$, where $$V_{INmin,A} = 4*[V_{DD} + V_{DO} + I_{supply} * (R_{OB} + R_{OA}/2) + V_{BE}].$$

For an IC to benefit from the power supply topology shown in FIG. 7, the upper limit of its input supply voltage range may be expected to exceed $V_{INmin,A}$.

It should also be noted that while various embodiments disclosed herein include a specific type (Buck) voltage regulator, the methods described herein may equally be applied to other types of power regulators. Furthermore, as disclosed herein, a cascade configuration of voltage splitters refers to a configuration in which a leading (front) voltage splitter receives a supply input voltage at its voltage input, and provides an output voltage as the input voltage received at the respective voltage input by a next voltage splitter in the cascade configuration. The voltage output of each intermediate voltage splitter in the cascade configuration is provided as the voltage input to the next voltage splitter in the cascade configuration, except the last voltage splitter in the cascade configuration provides its output voltage to a node which is coupled to the respective input(s) of the one or more linear regulators. It should also be noted that step down fractional charge pumps, (which can generate a no load output voltage of $V_{in}/3$ or $V_{in}/4$, etc., for example), can also be used in place of voltage splitters, which are also considered step down charge pumps).

Furthermore, the inputs of the linear regulators (e.g. the linear regulators in FIGS. 6 and 7) do not necessarily have to be connected together as shown in those figures. For example, referring to FIG. 7, if the output voltage of regulator 714 is much higher than the output voltage of regulator 716 (e.g. $V_{DD}$=5V and $V_{DD1}$=2.5V), then it may make sense (e.g. at $V_{IN}$=12V) to connect the input of regulator 714 to the output of UVS 761, and the input of regulator 716 to the output of UVS 711.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A power supply comprising:
   one or more voltage splitters configured to provide a supply current at a supply node, based on an input voltage;
   one or more linear voltage regulators coupled to the supply node and configured to provide one or more respective regulated output voltages responsive to the supply current; and
   a current source configured to provide a start-up current at the supply node until the input voltage is of sufficient value for the one or more voltage splitters to provide the supply current;
   wherein the one or more linear voltage regulators are configured to provide the one or more respective regulated output voltages responsive to:
   the start-up current when the current source is providing the start-up current; and
   the supply current when the one or more voltage splitters are providing the supply current.

2. The power supply of claim 1, wherein the one or more voltage splitters comprise:
   a first voltage splitter configured to:
   turn on when the input voltage reaches a first threshold value; and
   responsive to turning on, provide the supply current at the supply node; and
   a second voltage splitter configured to:
   turn on when the input voltage reaches a second threshold value higher than the first threshold value; and
   responsive to turning on, provide the supply current at the supply node together with the first voltage splitter;
   wherein the first voltage splitter and the second voltage splitter are arranged in a cascade configuration.

3. The power supply of claim 1, wherein at least one voltage splitter of the one or more voltage splitters comprises:
   an input node configured to receive the input voltage;
   an output node coupled to the supply node;
   a first, second, and third capacitor; and
   switching circuitry configured to:
   switchably couple the first capacitor in parallel with the second capacitor across the input node and the output node during a first switching phase; and
   switchably couple the first capacitor in parallel with the third capacitor across the output node and a voltage reference during a second switching phase.

4. The power supply of claim 3, wherein the switching circuitry comprises:
   transistor devices configured as switching elements; and
   drivers configured to control switching of the transistor devices;
   wherein the switching circuitry is configured to:
   control a first number of the drivers to turn on an associated first number of the transistor devices, and control a remaining number of the drivers to turn off an associated remaining number of the transistor devices during the first switching phase; and
   control the first number of the drivers to turn off the associated first number of the transistor devices, and control the remaining number of the drivers to turn on the associated remaining number of the transistor devices during the second switching phase.

5. The power supply of claim 4, wherein the switching circuitry further comprises a signal generator configured to generate two complementary clock signals to control the drivers, wherein the two complementary clock signals are respectively associated with the first switching phase and the second switching phase.

6. The power supply of claim 3, wherein the switching circuitry is further configured to short the input node to the output node, responsive to receiving an enable input value instructing the switching circuitry to disable the at least one voltage splitter.

7. A switched mode power supply (SPS) circuit comprising:
   at least two cascaded unregulated step-down charge pumps having an output configured to provide a supply current based on a main input voltage;
   one or more linear voltage regulators coupled to the output of the at least two cascaded unregulated step-down charge pumps, and configured to provide one or more respective output supply voltages based on the supply current; and
   a start-up current source configured to provide the supply current until the input voltage is sufficiently high for the at least two cascaded unregulated step-down charge pumps to be functional to provide supply current.

8. The SPS of claim 7, wherein the at least two cascaded unregulated step-down charge pumps are configured to couple to external capacitors arranged in a configuration that allows the at least two cascaded unregulated step-down charge pumps to develop an input current in the at least two cascaded unregulated step-down charge pumps that is less than the supply current.

9. The SPS of claim 7, wherein each of the at least two cascaded unregulated step-down charge pumps is configured to be activated and deactivated responsive the input voltage reaching a corresponding respective specified value.

10. The SPS of claim 7, wherein each unregulated step-down charge pump of the at least two cascaded unregulated step-down charge pumps is configured to short its input to its output when the unregulated step-down charge pump is disabled.

11. The SPS of claim 7, wherein each unregulated step-down charge pump of the at least two cascaded unregulated step-down charge pumps comprises:
   an input node configured to receive an input voltage and couple to one end of a first capacitor;
   an output node configured to couple to the other end of the first capacitor and to one end of a second capacitor having its other end coupled to a voltage reference; and a switching core having a first control node for coupling to one end of a third capacitor, and a second control node for coupling to the other end of the third capacitor;

wherein the switching core is configured to switchably couple the third capacitor in parallel with the first capacitor during a first switching phase, and switchably couple the third capacitor in parallel with the second capacitor during a second switching phase, to effect an output current based on the input voltage at the output node.

12. A semiconductor device comprising:

one or more linear voltage regulators each having a respective input node configured to receive a respective portion of a supply current, and each configured to provide a respective output supply voltage based on the received respective portion of the supply current;

at least two voltage splitters coupled in series to form a series of cascaded voltage splitters, wherein a respective output node of each voltage splitter of the series of cascaded voltage splitters is coupled to a respective input node of a next voltage splitter in the series of cascaded voltage splitters;

wherein the respective input node of a first voltage splitter in the series of cascaded voltage splitters is configured to receive an input voltage;

wherein the respective output node of a last voltage splitter in the series of cascaded voltage splitters is coupled to the respective input node of at least one linear voltage regulator of the one or more linear voltage regulators, and is configured to provide the supply current based on the input voltage under a first set of conditions; and a start-up current source coupled to the respective input node of each linear voltage regulator, and configured to provide the supply current under a second set of conditions.

13. The semiconductor device of claim 12, wherein the first set of conditions comprises the at least two voltage splitters being disabled; and wherein the second set of conditions comprises the input voltage being sufficiently high for at last one of the cascaded voltage splitters to become functional for the respective output node of the last voltage splitter to provide the supply current.

14. The semiconductor device of claim 12, wherein the last voltage splitter is configured to:

turn on when the input voltage reaches a first threshold value; and responsive to turning on, effect at least a first portion of the supply current at its respective output node; and wherein the first voltage splitter is configured to:

turn on when the input voltage reaches a second threshold value higher than the first threshold value; and responsive to turning on, effect at least a second portion of the supply current at respective output node of the last voltage splitter.

15. The semiconductor device of claim 12, wherein each voltage splitter of the series of cascaded voltage splitters comprises:

a first, second, and third control node configured to respectively couple to a first, second, and third capacitor; and switching circuitry configured to:

switchably couple the first capacitor in parallel with the second capacitor across the respective input node and the respective output node of the voltage splitter during a first switching phase; and switchably couple the first capacitor in parallel with the third capacitor across the respective output node of the voltage splitter and a voltage reference during a second switching phase.

16. The semiconductor device of claim 15, wherein the switching circuitry comprises:

transistor devices configured as switching elements; and drivers configured to control switching of the transistor devices;

wherein the switching circuitry is configured to:

control a first number of the drivers to turn-on an associated first number of the transistor devices, and control a remaining number of the drivers to turn off an associated remaining number of the transistor devices during the first switching phase; and control the first number of the drivers to turn off the associated first number of the transistor devices, and control the remaining number of the drivers to turn on the associated remaining number of the transistor devices during the second switching phase.

17. The semiconductor device of claim 16, wherein the switching circuitry further comprises a signal generator configured to generate two complementary clock signals to control the drivers, wherein the two complementary clock signals are respectively associated with the first switching phase and the second switching phase.

18. The semiconductor device of claim 15, wherein the switching circuitry is further configured to short the respective input node of the voltage splitter to the respective output node of the voltage splitter, responsive to receiving an enable input value instructing the switching circuitry to disable the voltage splitter.

19. A method for supplying at least one supply voltage, the method comprising:

enabling a first unregulated step-down charge pump (SCP) responsive to a first condition;

receiving an input voltage at the first SCP, responsive to said enabling the first SCP, and providing a supply current based on the input voltage using the first SCP, wherein the supply current has a higher value than an input current developed in the first SCP;

enabling a start-up current source responsive to a second condition;

providing the supply current based on the input voltage using the start-up current source, responsive to said enabling the start-up current source; and receiving at least a first portion of the supply current at a linear voltage regulator (LVR), and providing a respective first regulated output voltage based on the received at least a first portion of the supply current using the linear voltage regulator.

20. The method of claim 19, wherein the first condition comprises the input voltage rising to a sufficient level for the first SCP to be able to provide the supply current; and wherein the second condition comprises the first SCP being disabled.

21. The method of claim 19, further comprising:

enabling a second SCP responsive to a third condition;

receiving as input voltage at the second SCP an output voltage provided by the first SCP, responsive to said enabling the second SCP; and providing the supply current using the second UVS and the first UVS together, responsive to receiving the output voltage provided by the first SCP.

22. The method of claim 21, wherein the first condition comprises the input voltage rising to a level higher than a first threshold voltage;

wherein the third condition comprises the input voltage rising to a level higher than a second threshold voltage that is higher than the first threshold voltage; and wherein the second condition comprises the input voltage residing at a level that is not higher than the first threshold voltage.

23. The method of claim 21, further comprising:
receiving respective portions of the supply current at one or more additional LVRs; and
providing respective regulated output voltages according to the received respective portions of the supply current using the one or more additional LVRs, responsive to receiving the respective portions of the supply current.

24. The method of claim 19, wherein the first SCP comprises a first, second, and third control node configured to respectively couple to a first, second, and third capacitor, wherein said providing the supply current using the first SCP comprises:
alternately coupling:
the first capacitor in parallel with the second capacitor across a respective input node of the first UVS and a respective output node of the first UVS during a first switching phase; and
the first capacitor in parallel with the third capacitor across the respective output node of the first UVS and a voltage reference, during a second switching phase;
wherein the respective input node of the UVS is configured to receive the input voltage, and the respective output node of the first UVS is configured to provide the supply current.

25. The method of claim 24, wherein said alternately coupling comprises alternating between the first switching phase and the second switching phase at a specified frequency.

26. The method of claim 24, further comprising:
generating two complementary clock signals respectively associated with the first switching phase and the second switching phase;
controlling said coupling the first capacitor in parallel with the second capacitor using a first clock signal of the two complementary clock signals; and
controlling said coupling the first capacitor in parallel with the third capacitor using a second clock signal of the two complementary clock signals.

27. A switched mode power supply (SPS) circuit comprising:
an unregulated step-down charge pump having an output configured to provide a supply current based on a main input voltage;
one or more linear voltage regulators coupled to the output of the unregulated step-down charge pump, and configured to provide one or more respective output supply voltages based on the supply current; and
a start-up current source configured to provide the supply current until the input voltage is sufficiently high for the unregulated step-down charge pump to be functional to provide supply current.

28. The SPS of claim 27, wherein the unregulated step-down charge pump is configured to couple to external capacitors arranged in a configuration that allows the unregulated step-down charge pump to develop an input current that is less than the supply current.

29. The SPS of claim 27, wherein the unregulated step-down charge pump is configured to be activated and deactivated responsive the input voltage reaching a specified value.

30. The SPS of claim 27, wherein the unregulated step-down charge pump is configured to short its input to its output when the unregulated step-down charge pump is disabled.

31. The SPS of claim 27, wherein the unregulated step-down charge pump comprises:
an input node configured to receive an input voltage and couple to one end of a first capacitor;
an output node configured to couple to the other end of the first capacitor and to one end of a second capacitor having its other end coupled to a voltage reference; and
a switching core having a first control node for coupling to one end of a third capacitor, and a second control node for coupling to the other end of the third capacitor;
wherein the switching core is configured to switchably couple the third capacitor in parallel with the first capacitor during a first switching phase, and switchably couple the third capacitor in parallel with the second capacitor during a second switching phase, to effect an output current based on the input voltage at the output node.

32. An electronic system comprising:
one or more system components configured to receive one or more supply voltages to perform specified system functions;
one or more step-down charge pumps (SCPs) configured to provide a supply current at a supply node, based on an input voltage;
one or more voltage regulators coupled to the supply node and configured to provide the one or more supply voltages responsive to the supply current; and
a current source configured to provide a start-up current at the supply node until the input voltage is of sufficient value for the one or more SCPs to provide the supply current;
wherein the one or more voltage regulators are configured to provide the one or more supply voltages responsive to:
the start-up current when the current source is providing the start-up current; and
the supply current when the one or more SCPs are providing the supply current.

33. The electronic system of claim 32, wherein the one or more SCPs comprise:
a first SCP configured to:
turn on when the input voltage reaches a first threshold value; and
responsive to turning on, provide the supply current at the supply node; and
a second SCP configured to:
turn on when the input voltage reaches a second threshold value higher than the first threshold value; and
responsive to turning on, provide the supply current at the supply node together with the first SCP;
wherein the first SCP and the second SCP are arranged in a cascade configuration.

34. The electronic system of claim 32, wherein at least one SCP of the one or more SCPs comprises:
an input node configured to receive the input voltage;
an output node coupled to the supply node;
a first, second, and third capacitor; and
switching circuitry configured to:
switchably couple the first capacitor in parallel with the second capacitor across the input node and the output node during a first switching phase; and
switchably couple the first capacitor in parallel with the third capacitor across the output node and a voltage reference during a second switching phase.

35. The electronic system of claim 34, wherein the switching circuitry comprises:
  switching elements; and
  drivers configured to control switching of the switching elements;
  wherein the switching circuitry is configured to:
    control a first number of the drivers to turn on an associated first number of the switching elements, and control a remaining number of the drivers to turn off an associated remaining number of the switching elements during the first switching phase; and
    control the first number of the drivers to turn off the associated first number of the switching elements, and control the remaining number of the drivers to turn on the associated remaining number of the switching elements during the second switching phase.

36. The electronic system of claim 35, wherein the switching circuitry further comprises a signal generator configured to generate two complementary clock signals to control the drivers, wherein the two complementary clock signals are respectively associated with the first switching phase and the second switching phase.

37. The electronic system of claim 34, wherein the switching circuitry is further configured to short the input node to the output node, responsive to receiving an enable input value instructing the switching circuitry to disable the at least one SCP.

* * * * *